United States Patent [19]

Lockwood et al.

[11] Patent Number: 4,779,170
[45] Date of Patent: Oct. 18, 1988

[54] PHONOGRAPH RECORD ILLUMINATION DEVICE AND SYSTEM

[75] Inventors: Mark Lockwood, 129 Santa Maria Ave., Portola Valley, Calif. 94025; Duane D. Beyer, Lafayette, Calif.; Paul Kardel, Mountain View, Calif.; Charles A. Lockwood, Portola Valley, Calif.

[73] Assignee: Mark Lockwood, Portola Valley, Calif.

[21] Appl. No.: 118,655

[22] Filed: Nov. 9, 1987

[51] Int. Cl.⁴ .................................................. G11B 33/06
[52] U.S. Cl. ........................................ 362/87; 369/56; 362/190; 362/86
[58] Field of Search ................... 369/56, 57; 362/86, 362/87, 190, 191

[56] References Cited

U.S. PATENT DOCUMENTS

| 2,309,060 | 1/1943 | Glaser | 369/56 |
| 2,949,529 | 8/1960 | Ogawa | 362/87 |
| 3,281,150 | 10/1966 | Wilkins | 369/56 |

Primary Examiner—Ira S. Lazarus
Assistant Examiner—Sue Hagarman
Attorney, Agent, or Firm—Flehr, Hohbach, Test, Albritton & Herbert

[57] ABSTRACT

An illumination device (10) for a phonograph record (18) has a housing (14) and bolts (22) for attaching the housing (14) to a phonograph tone arm (12). A battery (26) in the housing (14) and a contact switch (32) on the housing are connected to activate a timing circuit (28) for supplying current from the battery (26) to a light emitting diode (30). The light emitting diode (30) is positioned to illuminate an area around point (36) that stylus (20) contacts the record for a predetermined of time after the contact switch (32) is closed.

10 Claims, 5 Drawing Sheets

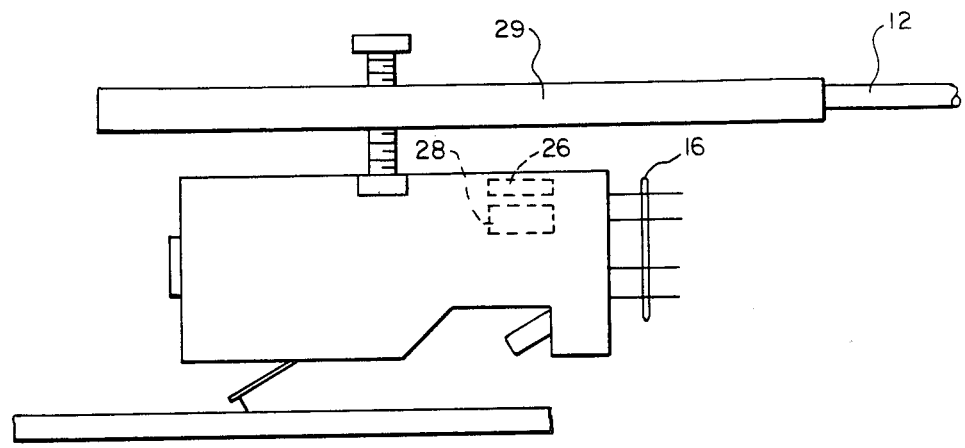
FIG.—1
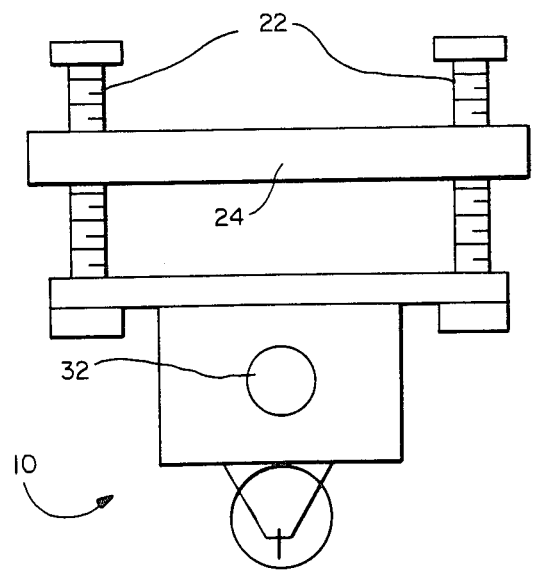
FIG.—2

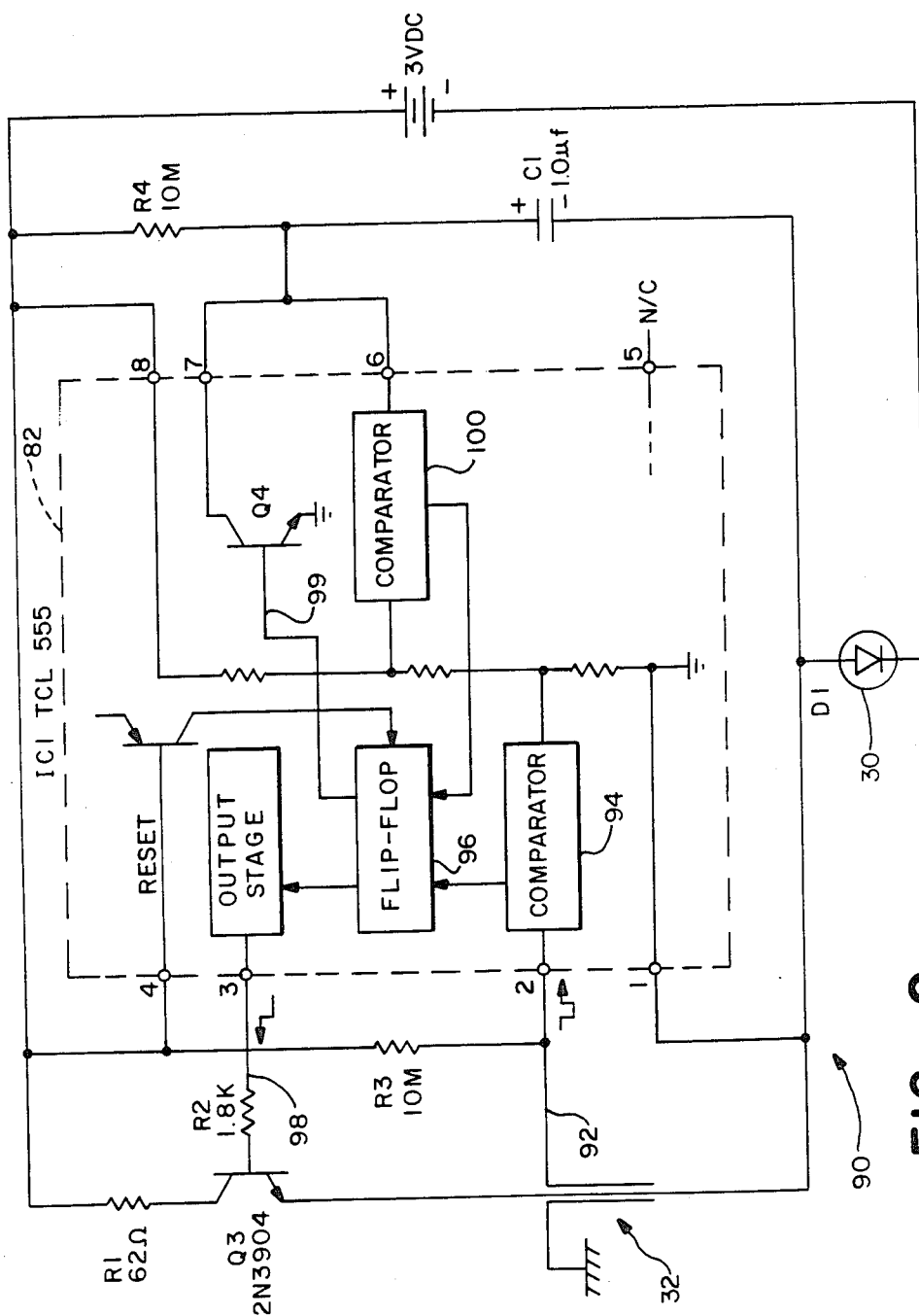
FIG.—9

PHONOGRAPH RECORD ILLUMINATION DEVICE AND SYSTEM

BACKGROUND OF THE INVENTION

1. Field of the Invention

This invention relates to a novel device and system forming part of a phonograph pickup cartridge or otherwise attached to a tone arm of the phonograph. More particularly, it relates to such a device and system of improved construction which directs light at a record from a location near the cartridge or stylus in order to increase the accuracy of cueing the stylus on the record.

2. Description of the Prior Art

It is known in the prior art to facilitate cueing a phonograph stylus or needle on a phonograph record by illuminating the record from an incandescent lamp or similar light source attached to or built into the tone arm of the photograph. Such illumination systems are shown, for example, in the following issued U.S. Patents: U.S. Pat. No. 1,193,825, issued Aug. 8, 1916 to Roop; U.S. Pat. No. 2,309,060, issued Jan. 19, 1943 to Glaser; U.S. Pat. No. 2,949,529, issued Aug. 16, 1960 to Ogawa and U.S. Pat. No. 4,079,944, issued Mar. 21, 1978 to Durley III et al. Construction of a magnetic phonograph pickup cartridge is further described in U.S. Pat. No. 3,846,592, issued Nov. 5, 1974 to Stanton. While the concept of providing such illumination has therefore been known for many years, such illumination systems have not achieved commercial acceptance. The prior art systems have been bulky, built into the tone arm, too heavy for use with present day low force tone arms, or otherwise unsuited for use with present day tone arm and cartridge construction. As a result, they cannot be retrofit in existing phonographs, and their incorporation as original equipment in phonographs would require substantial changes in current phonograph designs.

SUMMARY OF THE INVENTION

Accordingly, it is an object of this invention to provide a phonograph record illumination device which may readily be attached to existing phonograph tone arms.

It is another object of the invention to provide such a phonograph record illumination device which does not require modification of electrical circuits on an existing phonograph for installation of the device.

It is a further object of the invention to provide such a phonograph record illumination device which can be attached to phonograph tone arms of different configurations.

It is another object of the invention to provide an improved illumination circuit for use in such a phonograph record illumination device.

It is still another object of the invention to provide an improved miniaturized package for such a phonograph record illumination device.

The attainment of these and related objects may be achieved through use of the novel phonograph record illumination device, illumination circuit for such device and system herein disclosed. A phonograph record illumination device in accordance with this invention has a housing and a miniature light source, preferably a light emitting diode (LED) attached to the housing. A miniature battery is provided in the housing and is connected to provide power to a timing circuit and to the light source. A contact switch is provided on the housing to activate the timing circuit for providing power to the light source for a desired interval of time after the switch is closed. A means is provided for attaching the housing to a tone arm. The attaching means is configured so that the housing can be attached to conventional tone arms of different configuration. The illumination device may be configured as part of a replacement cartridge for the tone arm or as a separate attachment for mounting on the tone arm. In use of the illumination device, a counterweight associated with the tone arm is adjusted to compensate for the extra weight of the device, or an additional counterweight supplied with the device is attached to the tone arm on the other side of the tone arm pivot point to provide the compensation.

The illumination device of this invention is simple and compact in construction, includes its own power source, and is not limited by its configuration for use with a single configuration tone arm. As a result, the device can be easily retrofit to existing tone arms as well as being provided on new phonographs.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a side view of a phonograph record illumination device and system in accordance with the invention.

FIG. 2 is a front view of the phonograph record illumination device and system shown in FIG. 1.

FIG. 9 is a schematic diagram of another illumination circuit usable in the phonograph record illumination device and system shown in FIGS. 1-7.

DETAILED DESCRIPTION OF THE INVENTION

Figure 3:
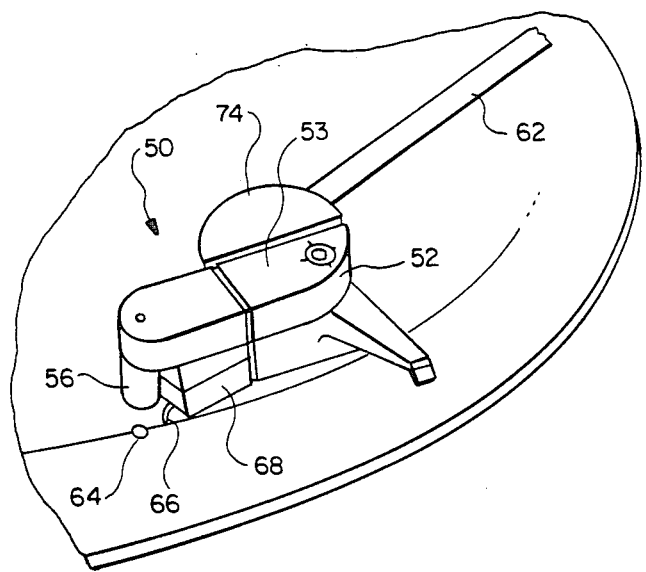
FIG. 3 is a perspective view of another embodiment of a phonograph record illumination device and system in accordance with the invention.

Turning now to the drawings, more particularly to FIGS. 1 and 2, there is shown a phonograph record illumination device 10 in accordance with the invention, mounted on a conventional tone arm 12 to give a phonograph record illumination system in accordance with the invention. The illumination device 10 is formed as part of a cartridge 14, which is used to replace a conventional cartridge otherwise used with the tone arm 12. The cartridge 14 has a plurality of leads 16 having an industry standard configuration and arrangement for plugging into a conventional socket (not shown) forming part of the tone arm 12. The leads 16 are connected to supply signal inputs resulting from engagement of grooves in record 18 by stylus 20 mounted on the cartridge 14. This aspect of the cartridge 14 is conventional in nature and will not be described further. Mounting bolts 22 attach the cartridge 14 to headshell 24 of the tone arm 12. The mounting bolts 22 may be omitted for those types of tone arms which rely on the leads 16 alone to hold the cartridge 14 in place.

A miniature battery 26 and a timing circuit module 28 are mounted within the cartridge 14. A focusing LED 30 is mounted within easy recess 31, directed at the stylus 20 and connected to the timing circuit module and to the miniature battery. A contact switch 32 is mounted on front 34 of the cartridge 14 and is connected to initiate the timing circuit module 28 when the switch 32 is momentarily closed. Timing circuit module 28 then supplies power from the battery 26 to illuminate the LED for a predetermined interval, for example, 10 to 15 seconds. Illuminating the LED on demand for a limited time in this manner means that a substantial life (for example, one year) may be obtained with a conventional watch battery. The LED 30 is positioned close enough to the stylus 20 so that sufficient illumination of the record 18 near the point 36 that the stylus 20 contacts the record 18 so that the stylus 20 can be very accurately positioned on the record 18.

FIGS. 3–7 show another phonograph record illumination device 50 in accordance with the invention. Housing 52 of the device 50 contains the miniature battery 26 and a flexible printed circuit 54. The focusing LED 30 is attached to the flexible printed circuit 54 and extends into a cylinder 56 forming part of the housing 52 so that it points downward toward the record 18. Capacitive contact switch 32 is mounted on top 53 of the housing 52. A double-sided adhesive strip 58 is provided on bottom 59 of the housing 52 for attaching the housing 52 to headshell 60 of the tone arm 62 to position the focusing LED 30 for illuminating around the point of contact 64 of stylus 66 on record 18. Cartridge 68, the tone arm 62 and the stylus 66 are of conventional construction, and the configuration of the phonograph illumination device 50 allows it to be used with most commercially available tone arms and cartridges.

Figure 4:
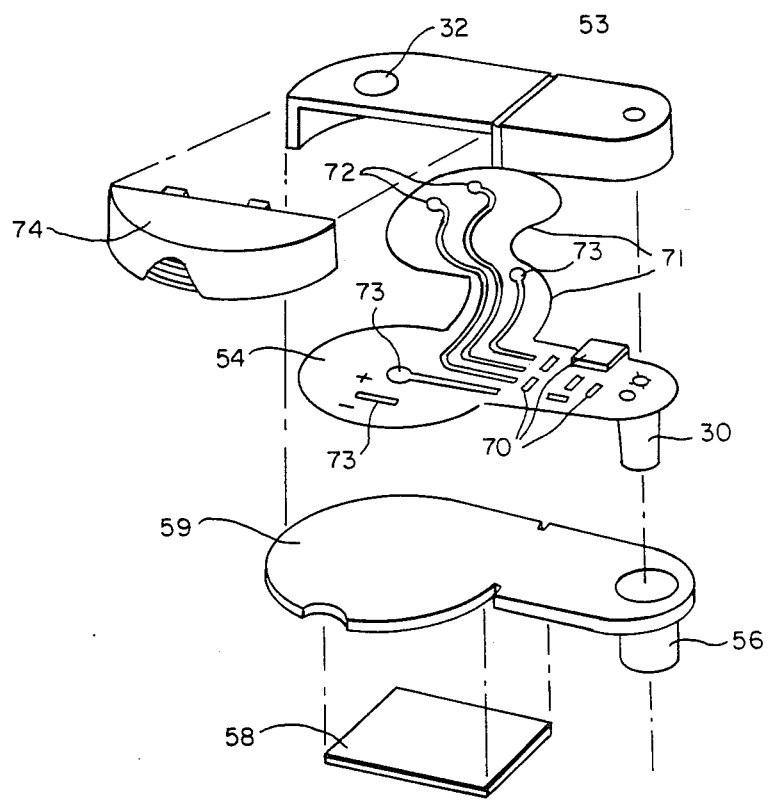
FIG. 4 is an exploded perspective view of the phonograph record illumination device and system shown in FIG. 3.
Figure 5:
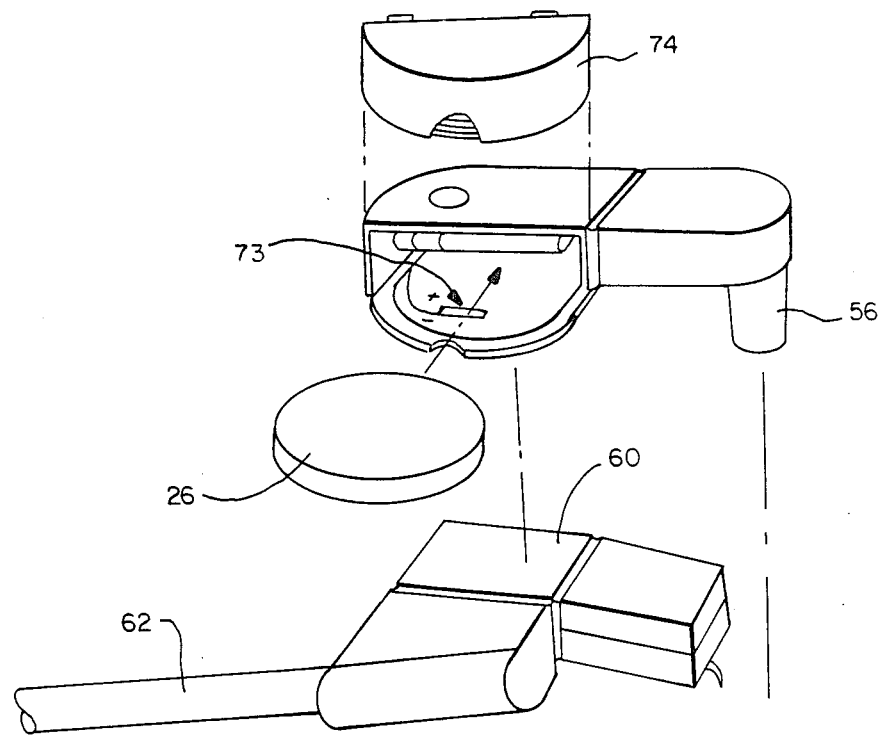
FIG. 5 is a partially exploded perspective view of the phonograph record illumination device and system shown in FIGS. 3 and 4.
Figure 6:
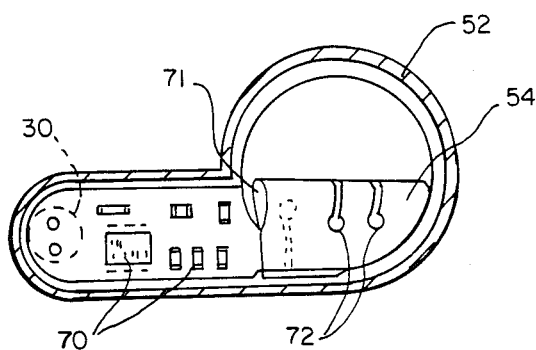
FIG. 6 is a cross-section view, taken along the line 6—6 in FIG. 3.
Figure 7:
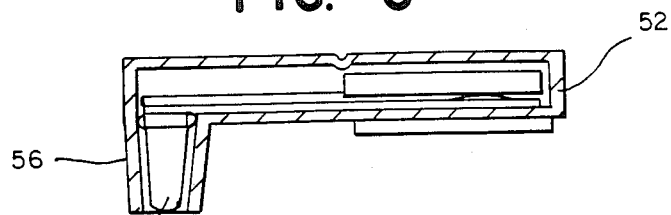
FIG. 7 is another cross-section view, taken along the line 7—7 in FIG. 3.

As shown in FIGS. 4 and 6, components 70 used to form an illumination circuit 80 (See also FIG. 8) are surface mounted onto the flexible printed circuit 54. The flexible printed circuit 54 is flexed to give a reverse bend 71, so that capacitive switch leads 72 face upward toward the underside of the top 53. The underside of the top 53 has mating capacitive switch contacts (not shown), which engage the leads 72. With the battery 26 inserted into the reverse bend 71 of the flexible printed circuit 54, as indicated in FIG. 5 and shown in FIGS. 6 and 7, battery contacts 73 on the printed circuit 54 engage the battery 26. A snap-off cover 74 allows replacement of the battery 26 as needed.

When the illumination devices 10 and 50 are mounted on the tone arms 12 and 62, if the tone arms have an adjustable counterweight, it is adjusted to compensate for the extra weight of the devices 10 and 50, so that the tracking force of the tone arm is returned to specification. If the tone arms 12 and 62 do not have an adjustable counterweight, a counterweight supplied with the illumination devices 10 and 50 is attached to the tone arms 12 and 62 on the other side of the tone arm pivot point from the illumination devices 12 and 62, such as with a double-sided adhesive strip, similar to the attachment of the illumination device 50 to the tone arm 62, to achieve a similar compensation.

Figure 8:
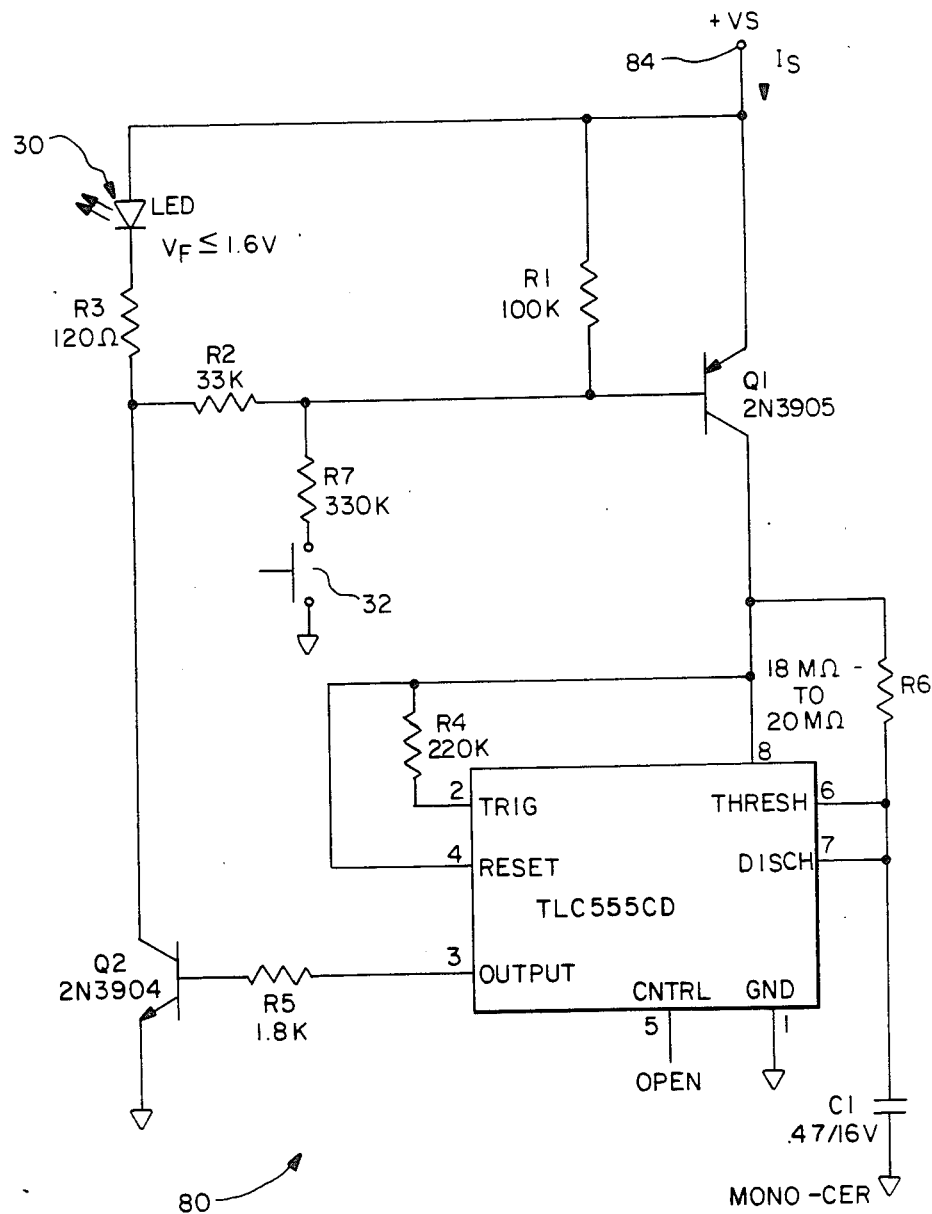
FIG. 8 is a schematic diagram of an illumination circuit usable in the phonograph record illumination device and system shown in FIGS. 1-7.

FIG. 8 shows an illumination circuit 80 which is usable in the phonograph record illumination devices 10 and 50. The illumination circuit 80 has a TLC555CD flat pack integrated circuit 82, connected for monostable operation. In this mode of operation, the timer circuit 82 functions as a one shot. Capacitor C1 is initially held discharged by a transistor inside the timer circuit 82. When contact switch 32 is closed, transistor Q1 is biased into conduction, and a trigger pulse is supplied to terminal 2 of the timing circuit 72. The trigger pulse sets a flip-flop within the timing circuit 82, which releases the short circuit across capacitor C1 and drives output terminal 3 high to bias transistor Q2 into conduction. LED 30 then remains illuminated for a time interval dependent on the RC time constant of resistor R6 and capacitor C1. At the end of the time interval, a comparator in the timing circuit then resets the flip-flop, which in turn discharges the capacitor C1 and drives output terminal 3 to its low state, turning off transistor Q2. The values of R6 and C1 are chosen to illuminate LED 30 for an appropriate time after switch 32 is closed, for example, from about 5 to about 15 seconds.

FIG. 9 shows another form of a timing circuit 90, which utilizes a single external transistor Q3 in addition to the TLC 555 integrated circuit 82, again connected for monostable operation as a one shot. Transistor Q4 when conducting holds capacitor C1 discharged. Closing switch 32 supplies a negative pulse on line 92 at terminal 2 of the integrated circuit 82, supplied as one input to comparator 94. Comparator 94 then sets flip-flop 96 to produce an output signal at terminal 3 of the integrated circuit on line 98 to bias transistor Q3 into conduction and another output on line 99 to turn off transistor Q4. LED 30 is illuminated as long as transistor Q3 remains turned on, and capacitor C1 charges during this interval. When capacitor C1 has a charge equal to $\frac{2}{3}$ of the +3 Volt supply, comparator 100 resets the flip-flop 96 to turn off transistor Q3 and turn on transistor Q4. LED 30 is then no longer illuminated and capacitor C1 is discharged until switch 32 is again closed. With resistor R4 and capacitor C1 having the values shown, LED 30 remains illuminated for about 10 seconds after switch 32 is closed. A unique feature of this circuit is that all current passes through LED 30, since it is in series to the negative terminal of the battery, thereby increasing the efficiency of the circuit. Further details on the operation of the TLC555CD integrated circuit are available in the data sheet for that part, obtainable from Texas Instruments, Dallas, Tex., or a data sheet for an equivalent part obtainable from other semiconductor manufacturers.

The illumination circuits 80 and 90 operate from one lithium 3 volt battery of the type conventionally employed in electronic watches, which is connected to terminal 84 in circuit 80. Standby current drain is less than 50 $\mu$A. The circuits do not require an ON-OFF switch. Holding the switch 32 will not hold the LED 30 ON and drain the battery. Holding the switch only causes a battery drain of about 170 micro A. In operation, the circuits will typically operate for 1000 illumination cycles over one year with a battery having a capacity of 35 mA-hour. In practice, the LED 30 is desirably implemented with an H-1000, H-2000 or H-3000 high intensity LED, obtainable from Stanley Electric Co., Ltd, Tokyo, Japan. Comparable focusing LEDs obtainable from other suppliers may also be used.

The value of resistor R3 in circuit 80 or R1 in circuit 90 may be adjusted lower for increased brightness of the LED 30 when the battery is low. Brightness of the LED 30 and circuit current drain decreases as the battery voltage falls. The circuit operates with supply voltages between 2.0V and 4.0V. It is preferable that the battery voltage remain at or above 2.5V under load at the end of the battery life. Changing the value of resistor R3 in circuit 80 or R1 in circuit 90 does not change the timing cycle.

It should now be readily apparent to those skilled in the art that a novel phonograph record illumination device capable of achieving the stated objects of the invention has been provided. The device is readily attachable to existing phonograph tone arms of varying configuration. The device is completely self-contained, in that it does not require modification of the phonograph electrical circuits for installation and has its own power supply. The illumination circuit employed in the illumination device is low power and allows the device to be implemented in miniaturized form.

It should further be apparent to those skilled in the art that various changes in form and details of the invention as shown and described may be made. It is intended that such changes be included within the spirit and scope of the claims appended hereto.

What is claimed is:

1. An illumination device for a phonograph record, which comprises a housing, means for attaching said housing to a phonograph tone arm, a battery in said housing, a timing circuit in said housing, a contact switch on said housing connected to activate said timing circuit, and a light source attached to said housing, said light source being configured and positioned to direct light around a point that a stylus on the tone arm contacts a record when said housing is attached to the tone arm, said light source being connected to said timing circuit and to said battery so that activation of said timing circuit will illuminate said light source for a predetermined time after said contact switch is closed.

2. The phonograph record illumination device of claim 1 in which said housing comprises a cartridge attachable to the phonograph tone arm, the housing additionally having a stylus mounted on said housing and a plurality of electrical connection leads electrically connected to supply signals generated from contact of a phonograph record by said stylus, said housing having a recess with said light source being mounted in the recess and directed toward said stylus.

3. The phonograph record illumination device of claim 1 in which said means for attaching said housing to the tone arm comprising an adhesive strip on said housing.

4. The phonograph record illumination device of claim 1 in which said timing circuit is mounted on a flexible printed circuit contained in said housing and said light source is attached to said flexible printed circuit.

5. The phonograph record illumination device of claim 4 in which said light source comprises a light emitting diode.

6. The phonograph record illumination device of claim 5 in which said flexible printed circuit is flexed in a double bend, said flexible printed circuit having leads positioned to engage said contact switch, and said battery being inserted in the double bend of said flexible printed circuit.

7. The phonograph record illumination device of claim 1 in which said light source is a light emitting diode and said timing circuit includes a first transistor connected to cause completion of a current flow path through said light emitting diode including said battery when biased into conduction, said timing circuit further including a resistance-capacitance network connected for charging of its capacitance by said battery, said contact switch being connected to bias said first transistor into conduction after said contact switch is closed, said resistance-capacitance network being connected to maintain the current flow path for a predetermined time interval after said contact switch is closed.

8. The phonograph record illumination device of claim 7 in which said first transistor is connected between said battery and said resistance-capacitance network and said timing circuit includes a second transistor connected to complete the current flow path, said resistance-capacitance network being connected to control biasing said second transistor into conduction for the predetermined time interval after said contact switch is closed.

9. The phonograph record illumination device of claim 7 in which said first transistor is in the current flow path, said resistance-capacitance network is connected in parallel with said first transistor to said light emitting diode and said resistance-capacitance network is connected to control biasing said first transistor into conduction for the predetermined time interval after said contact switch is closed.

10. The phonograph record illumination device of claim 9 in which said timing circuit includes a second transistor connected to short circuit a capacitor of said resistance-capacitance network when said first transistor is not biased into conduction and to allow the capacitor of said resistance-capacitance network to be charged when said first transistor is biased into conduction.

* * * * *